(12) United States Patent
Cronch et al.

(10) Patent No.: US 7,088,537 B2
(45) Date of Patent: Aug. 8, 2006

(54) REMOVING RESIDUAL MAGNETIZATION IN A DATA TRANSDUCER

(75) Inventors: Robert D. Cronch, Longmont, CO (US); James Brian Ray, Bethany, OK (US)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

(21) Appl. No.: 10/797,891

(22) Filed: Mar. 9, 2004

(65) Prior Publication Data

US 2005/0200997 A1    Sep. 15, 2005

(51) Int. Cl.
   G11B 5/03    (2006.01)
(52) U.S. Cl. .............................. 360/66; 360/46; 360/67
(58) Field of Classification Search ................. 360/31, 360/46, 66, 67, 113, 62, 126, 123
   See application file for complete search history.

(56) References Cited

U.S. PATENT DOCUMENTS

| | | | |
|---|---|---|---|
| 3,471,862 A | 10/1969 | Barney | |
| 3,938,011 A | 2/1976 | Littwin | |
| 4,471,403 A | 9/1984 | Dress, Jr. et al. | |
| 4,651,235 A | 3/1987 | Morita et al. | |
| 4,670,799 A * | 6/1987 | Ogura et al. | 360/66 |
| 4,742,270 A * | 5/1988 | Fernsler et al. | 315/8 |
| 4,787,002 A | 11/1988 | Isozaki | |
| 4,821,127 A * | 4/1989 | Soga et al. | 360/66 |
| 4,956,728 A | 9/1990 | Hayata et al. | |
| 4,970,621 A * | 11/1990 | Gailbreath et al. | 361/149 |
| 5,168,395 A * | 12/1992 | Klaassen et al. | 360/46 |
| 5,220,476 A | 6/1993 | Godwin et al. | |
| 5,359,470 A | 10/1994 | Taguchi et al. | |
| 5,392,169 A | 2/1995 | Argyle et al. | |
| 5,396,369 A * | 3/1995 | Deland et al. | 360/2 |
| 5,963,385 A * | 10/1999 | Takada et al. | 360/31 |
| 6,038,093 A * | 3/2000 | Takada et al. | 360/66 |
| 6,147,488 A * | 11/2000 | Bamba et al. | 324/210 |
| 6,351,340 B1 * | 2/2002 | Dixon | 360/66 |
| 6,388,413 B1 * | 5/2002 | Ng et al. | 318/560 |
| 6,407,545 B1 * | 6/2002 | Sato et al. | 324/212 |
| 6,504,675 B1 | 1/2003 | Shukh et al. | |
| 6,570,378 B1 * | 5/2003 | Goh et al. | 324/212 |
| 6,621,664 B1 | 9/2003 | Trindade et al. | |
| 6,646,827 B1 | 11/2003 | Khizroev et al. | |
| 6,670,056 B1 | 12/2003 | Hikosaka | |
| 6,671,117 B1 * | 12/2003 | Dimitrov et al. | 360/57 |
| 6,693,756 B1 * | 2/2004 | Teo et al. | 360/66 |

* cited by examiner

Primary Examiner—Wayne Young
Assistant Examiner—Dismery Mercedes
(74) Attorney, Agent, or Firm—Fellers, Snider, et al.

(57) ABSTRACT

Method and apparatus for removing residual magnetization in a data transducer, such as a recording head used to write data to a recording medium in a data storage device. A residual magnetization sense circuit senses a residual magnetization of a pole of the data transducer as a result of the application of a data transmission current to the transducer. A demagnetization current generator removes the residual magnetization by supplying the transducer with a demagnetizing current that decreases to a final magnitude in accordance with a selected profile. The demagnetization current preferably comprises a bi-directional, time varying current of selected frequency to the transducer that tapers linearly, exponentially or in a step-wise fashion to the final magnitude. The demagnetization profile is preferably continuously adapted during operation. Preferably, the sense circuit and demagnetization current generator are incorporated into a preamplifier/driver circuit which performs the demagnetization operation in a self-contained fashion.

22 Claims, 5 Drawing Sheets

REMOVING RESIDUAL MAGNETIZATION IN A DATA TRANSDUCER

FIELD OF THE INVENTION

The claimed invention relates generally to the field of magnetic recording and transmission systems and more particularly, but not by way of limitation, to an apparatus and method for removing residual magnetization in a data transducer.

BACKGROUND

Magnetic data transducers are used to transmit data in the form of magnetic pulses. Such transducers (heads) generally comprise a coil that surrounds a magnetically permeable pole structure.

Bi-directional, time varying data transmission currents applied to the coil result in the transmission of corresponding bi-directional, time varying magnetic pulses. In a magnetic transmission system, the pulses are generally conveyed through an appropriate medium to a remote receiver. In a data storage device, such pulses generally operate to magnetically orient a recording medium such as a disc.

It has been observed that at the conclusion of the application of a sequence of data transmission currents, the magnetically permeable pole of a transducer can exhibit a residual magnetism. That is, magnetic domains within the pole are not substantially randomly arrayed, but are more or less commonly aligned along a particular axial direction.

Such residual magnetism will tend to have a natural decay life and return to the desired net random alignment over time. However, during this decay interval the aligned magnetism of the pole can adversely affect operation of the transducer by introducing noise in subsequent transmissions. When the transducer is used to write data to a medium, such magnetization can undesirably erase data previously written to the medium as the medium moves adjacent the transducer.

While various approaches have been proposed in the art to address residual magnetism in a transducer, there nevertheless remains a continued need for improvements in the art, and it is to such improvements that the present invention is directed.

SUMMARY OF THE INVENTION

As embodied herein and as claimed below, the present invention is generally directed to an apparatus and method for removing residual magnetization in a data transducer.

The method preferably includes sensing a residual magnetization of a pole of a data transducer established by application of a data transmission current to transmit data, such as to a recording medium. The method further preferably includes removing said residual magnetization by supplying the transducer with a demagnetizing current that decreases to a final magnitude in accordance with a selected profile.

Preferably, the removing step comprises applying a bi-directional, time varying current of selected frequency to the transducer that tapers to the final magnitude. The magnitude of the bi-directional, time varying current preferably tapers linearly, exponentially or in a step-wise fashion. The frequency of the bi-directional, time varying current can also be changed as the current tapers to the final magnitude.

The apparatus preferably includes a sense circuit which senses a residual magnetization of a pole of a data transducer established by application of a data transmission current to transmit data, such as to a recording medium. The apparatus further preferably includes a demagnetizing current generator coupled to the sense circuit which removes said residual magnetization by supplying the transducer with a demagnetizing current selected in relation to the sensed residual magnetization.

The apparatus further preferably comprises a data write current generator which applies said write currents to the transducer prior to operation of the sense circuit. Preferably, the sense circuit detects current induced by the residual magnetism in a conductor coupled to the pole.

As before, the demagnetizing current generator preferably applies a bi-directional, time varying current of selected frequency, including changing frequency, to the transducer that tapers to a final magnitude linearly, exponentially or in a step-wise fashion. Preferably, the apparatus is embodied within a single preamplifier/driver integrated circuit device.

These and various other features and advantages which characterize the claimed invention will become apparent upon reading the following detailed description and upon reviewing the associated drawings.

DETAILED DESCRIPTION

Figure 1:
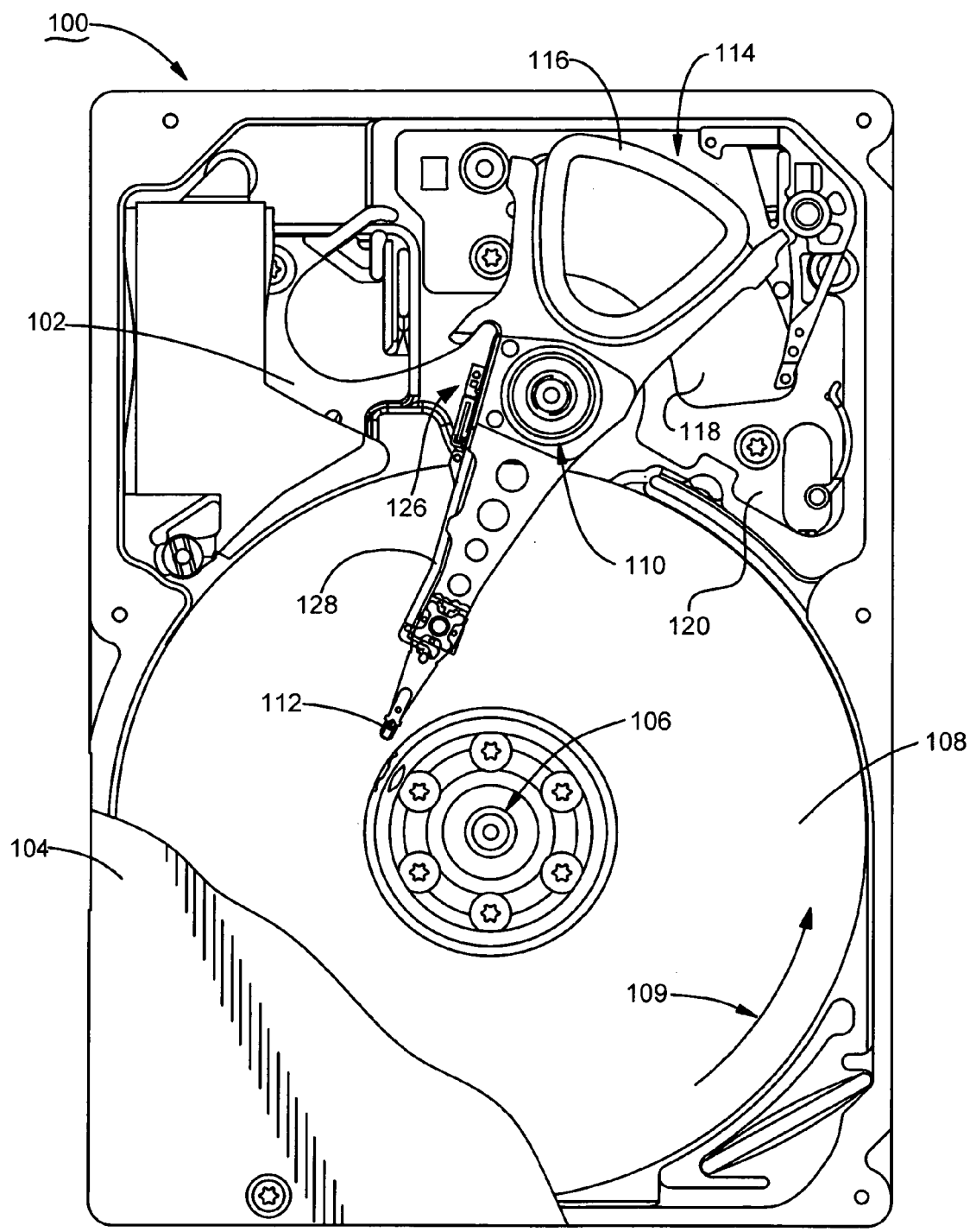
FIG. 1 is a top plan representation of a data storage device constructed and operated in accordance with preferred embodiments of the present invention.

FIG. 1 provides a top plan representation of a data storage device 100 constructed in accordance with preferred embodiments of the present invention. The data storage device is preferably characterized as a disc drive of the type which magnetically stores and retrieves digital data from and to a host device.

An enclosed housing 101 defines an internal, environmentally controlled environment for the device 100. The housing 101 is formed by a pair of substantially planar housing members including a base deck 102 and a top cover 104 (shown in partial cut-away in FIG. 1).

The base deck 102 supports a spindle motor 106 which rotates a plurality of data storage discs (media) 108 at a constant high speed in direction 109. A rotary actuator 110 supports a corresponding number of data transducers 112 (recording heads) adjacent data recording surfaces of the discs 108. The heads 112 are hydrodynamically supported adjacent the disc surfaces via recirculating fluidic currents established by the high speed rotation of the discs 108.

The actuator 110 is pivotally rotated through application of current to an actuator coil 114 of a voice coil motor (VCM) 116. As the actuator 110 rotates, the heads 112 are brought into alignment with data tracks defined on the disc surfaces to carry out writing and reading of data to and from data sectors on the tracks, respectively.

Figure 2:
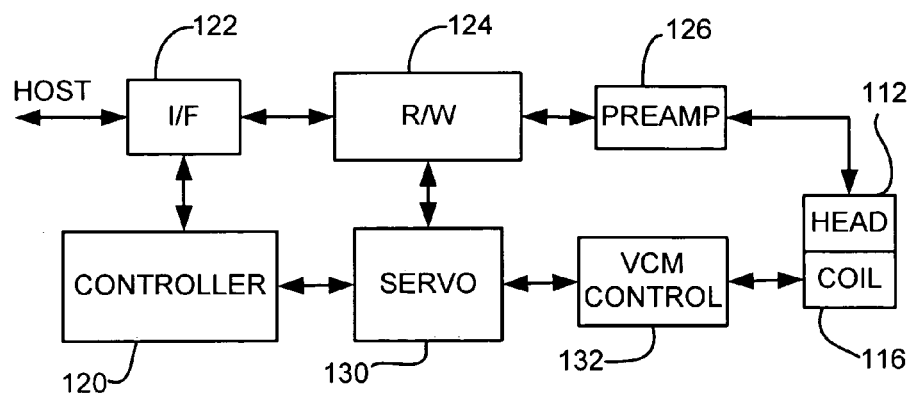
FIG. 2 is a functional block representation of the data storage device of FIG. 1.

FIG. 2 provides a generalized functional block diagram of the data storage device 100. Control electronics shown in FIG. 2 are substantially provisioned on a communications and control printed circuit board (PCB) mounted to the underside of the base deck 102 (and hence, not visible in FIG. 1).

A programmable controller 120 provides top level control for the device 100. The controller 120 interfaces with a host device (not shown) via an interface (I/F) circuit 122. The I/F circuit 122 includes a buffer (not shown) that temporarily stores data during transfers between the host and the discs 108.

A read/write (R/W) channel 124 cooperates with a preamplifier/driver circuit (preamp) 126 to write data to the discs 108 during a write operation and to reconstruct data previously stored to the discs 108 during a read operation. The preamp 126 is mounted to a side of the actuator 110 (FIG. 1) and communicates with the heads 112 via flex on suspension (FOS) conductors 128 (FIG. 1).

A servo circuit 130 uses servo control data transduced from the disc surfaces to provide positional control for the heads 112. The servo circuit 130 supplies current commands to a VCM control driver 132 to apply suitable currents to the VCM 114 in order to position the heads 112.

Figure 3:
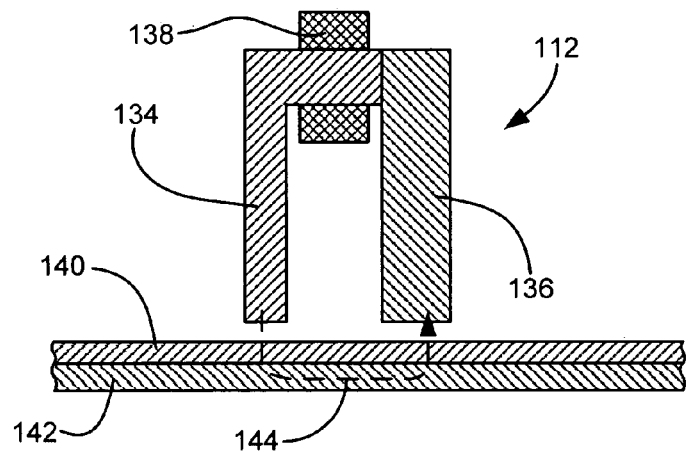
FIG. 3 provides an elevational, cross-sectional representation of one of the heads and the associated disc surface of the device of FIG. 1.

The device 100 is contemplated as being configured to carry out perpendicular recording as shown in FIG. 3, although the claimed invention is not so limited. Each head 112 is characterized as a perpendicular recording head having a write pole 134, a return pole 136 and a write coil 138 which surrounds the write pole 134. The associated disc 108 adjacent the head 112 includes a hard recording layer 140 overlaid upon a soft return layer 142. The layer 142, in turn, is disposed upon a substrate layer which is not shown for clarity.

During the transmission (writing) of data, bi-directional, time varying data transmission currents are supplied to the write coil 138 via preamp 126 and FOS conductors 128. These data transmission currents, also referred to as write currents, establish a corresponding modulated magnetic field that generally extends from the write pole 134, down through the recording layer 140, across the return layer 142 and then back up again through the recording layer to the return pole 136, as represented by path 144.

The relative cross-sectional areas of the write pole 134 and return pole 136 are selected such that the flux density of the field from the write pole 134 is sufficient to reorient the localized magnetization of the recording layer 140 in a direction normal to the direction of movement of the disc 108 with respect to the head (i.e., up or down with reference to FIG. 3). At the same time, the return field that enters the return pole 136 has a sufficiently lower flux density so as to not disturb the existing magnetization of the recording layer 140.

While operable, a problem that has been observed in the use of perpendicular recording heads such as 112 in FIG. 3 is residual magnetism in the structure of the head 112, particularly the write pole 134, at the conclusion of a write operation. This residual magnetism arises from the magnetic domains within the pole 134 being more or less commonly aligned along a particular axial direction instead of the desired, substantially random orientation.

Figure 4:
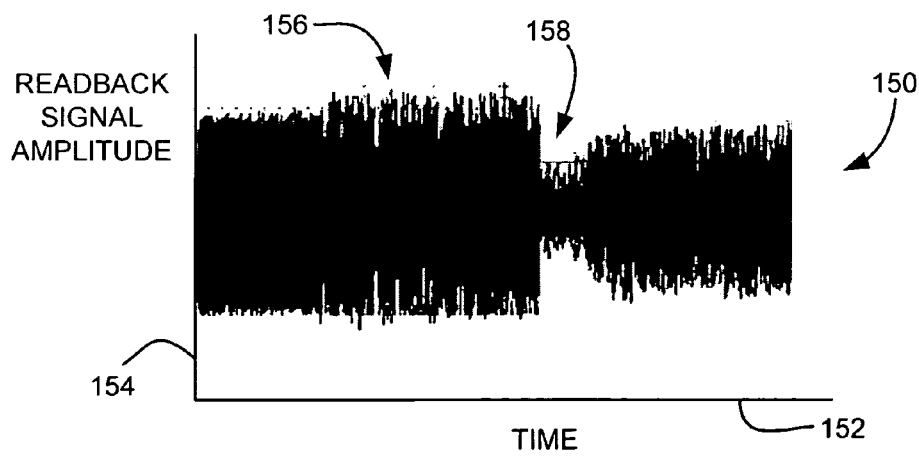
FIG. 4 provides a graphical representation of readback signal amplitude with respect to time.

When the residual magnetization is sufficiently pronounced, such magnetization can undesirably erase data previously written to the medium as the medium moves adjacent the transducer, as shown in FIG. 4. More particularly, FIG. 4 illustrates a readback signal 150 plotted against time x-axis 152 and amplitude y-axis 154 for data written and subsequently transduced by the head 112 using a magneto-resistive (MR) read element (not shown in FIG. 3).

It can be seen from FIG. 4 that after writing data to region 156, the residual magnetism in the write pole 134 partially erased previously stored data in region 158. The substantially reduced signal to noise ratio (SNR) in region 158 increases the difficulty in recovering this portion of the data from the readback signal 150.

Figure 5:
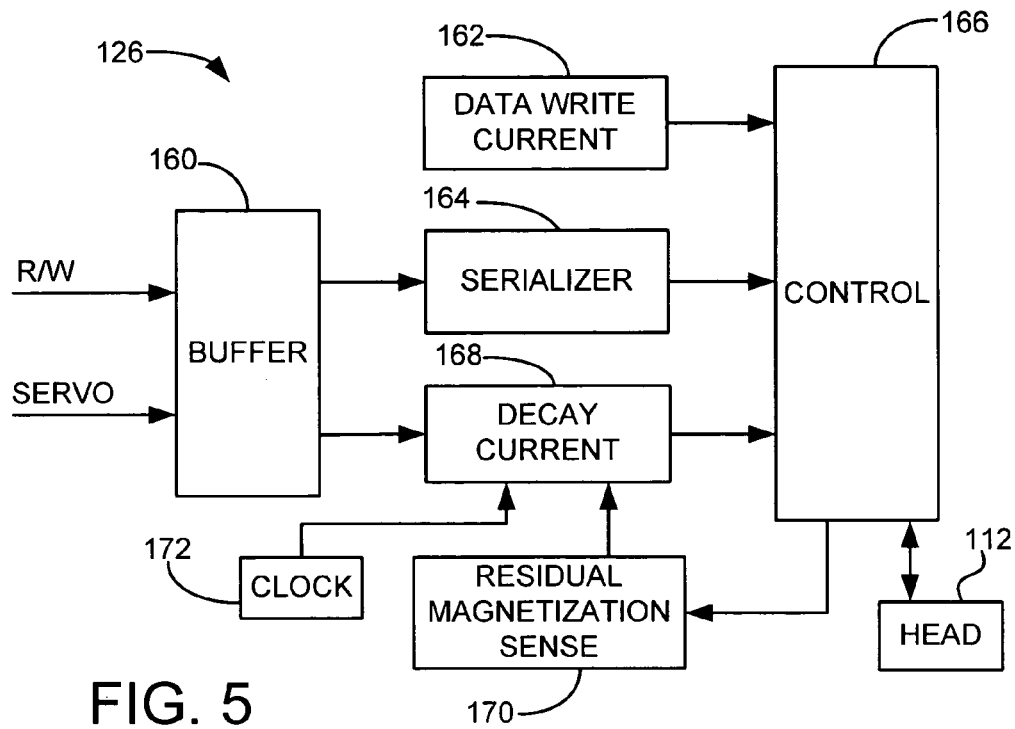
FIG. 5 is a functional block representation of relevant portions of the preamplifier driver circuit of the device of FIG. 1.

Accordingly, FIG. 5 provides a functional block representation of relevant portions of the preamp 126, which is configured to selectively apply a demagnetizing current to the head 112 at the conclusion of a write event. The preamp 126 includes a buffer 160, which receives inputs from the R/W channel 124 and the servo circuit 130.

The R/W channel 124 supplies data to be written to the discs 108 from the host. The servo circuit 130 supplies control inputs (as multi-bit control words) to configure the preamp 126 during operation such as head selection, write current magnitude, read bias current magnitude, etc.

A data write current generator 162 supplies the peak magnitude of write current used during normal data writing operations. A serializer block 164 serializes the data to provide a non-return-to-zero (NRZ) signal. The write current from the write current generator 162 is thus applied to the head 112 by a control block 166 with current reversals as dictated by the NRZ signal. It will be noted that while only one head 112 is shown in FIG. 4, it will be understood that the control block 166 includes selection circuitry (not separately shown) that selectively connects to each of the various heads 112 in turn as determined by the servo circuit 130.

The preamp 126 further includes a demagnetization current generator 168 which, as explained below, selectively applies a demagnetizing current sequence to the head 112 at the conclusion of a write event. The demagnetization current generator 168, also referred to as a "decay current" generator, preferably receives inputs from a residual magnetization sense circuit 170 and a clock 172, both preferably contained within the preamp 126. The operation of the demagnetization current generator 168 can be controlled either on-chip or by control inputs from the servo circuit 130, as desired. Thus, in some preferred embodiments, the preamp 126 is configured to carry out the entire demagnetization operation in an adaptive, self-contained manner.

Figure 6:
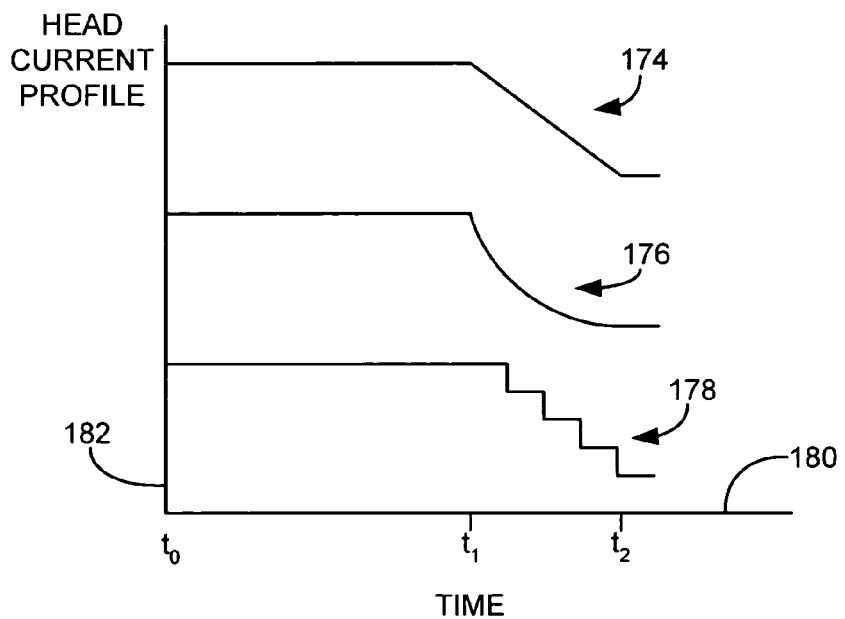
FIG. 6 provides graphical representations of data transmission currents supplied to the head of FIG. 3 by the circuit of FIG. 4 in accordance with preferred embodiments.

FIG. 6 provides a number of alternative current profiles 174, 176 and 178 which are applied to the head 112 by the preamp 126 in accordance with preferred embodiments of the present invention. The profiles 174, 176, 178 are plotted against a common elapsed time x-axis 180 and a common amplitude y-axis 182.

For each profile, the elapsed time from $t_0$ to $t_1$ generally represents time during which bi-directional, time varying write currents are applied to the head 112 to write data to the associated disc 108, as supplied by the write current generator 162 and serializer 164 of FIG. 5. The magnitude in this interval thus represents the peak magnitude established by the write current generator 162 for both positive and negative going transitions.

At time $t_1$, the preamp 126 applies the aforementioned demagnetization current which comprises a bi-directional, time varying current with peak magnitude that tapers to a final magnitude (preferably close to zero) at time $t_2$ in a linear (curve 174), exponential (curve 176) or step-wise fashion (curve 178).

The frequency at which the alternating current is applied is established in relation to the clock 172, and is preferably substantially higher than a frequency at which the data are written (interval $t_0$ to $t_1$). This frequency can be set at a selected value or can change as desired (such as in a continuously increasing fashion) as the current tapers to the final magnitude. Other characteristics of the demagnetization current, such as duration and shape, are also controllably selected as desired. In this way, any residual magnetization of the write pole 134 (FIG. 3) is substantially removed at the conclusion of the write event.

Figure 7:
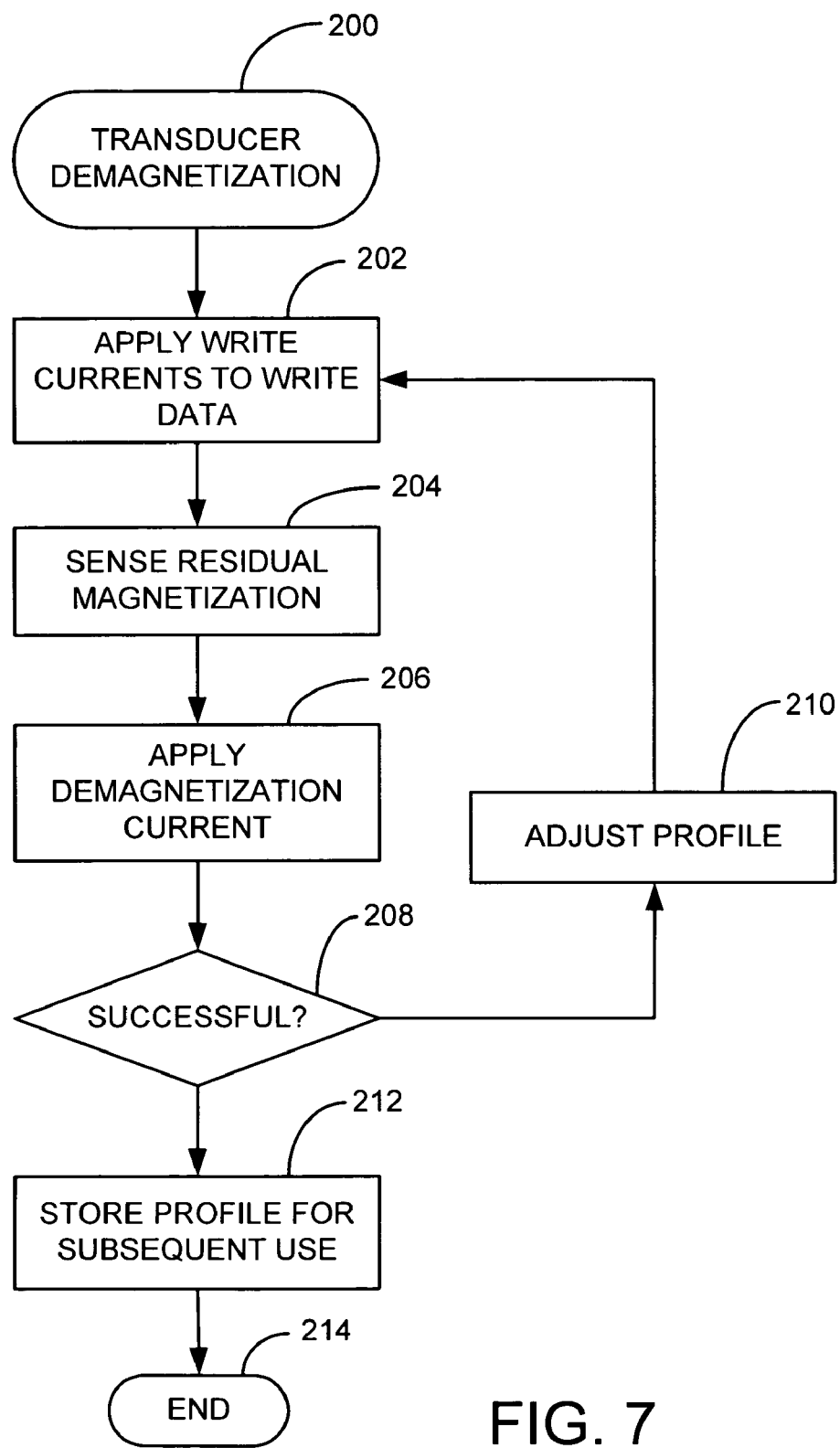
FIG. 7 is a flow chart for a TRANSDUCER DEMAGNETIZATION routine illustrative of steps carried out in accordance with preferred embodiments to sense and remove residual magnetization in the head of FIG. 3.

FIG. 7 provides a generalized flow chart for a TRANSDUCER DEMAGNETIZATION routine 200, illustrative of steps carried out by the preamp 126 in accordance with preferred embodiments. The routine is preferably carried out as part of a set-up/calibration process for the device 100, and is also preferably carried out during normal, subsequent operation of the device.

At step 202, write currents are initially applied to the head 112 to write a selected set of data to the associated disc 108. During calibration of the device 100, this step is preferably carried out on a special test track suitable for this purpose. At the conclusion of the writing step, the preamp 126 proceeds at step 204 to sense residual magnetization in the head 112 induced by step 202. This can be carried out in various ways.

In one preferred approach, step 204 entails removing the write current from the head 112 and monitoring the write coil 138 for a signal characteristic of such residual magnetization. Depending upon the head design, the current and/or voltage response of the write coil 138 can be correlated by the residual magnetic sense circuit 170 to the presence of a non-random magnetic state, due to the coupling of the write coil 138 to the write pole 134.

In another preferred approach, the disc 108 is allowed to rotate adjacent the head 112 and, on the next revolution, a readback signal such as the signal 150 in FIG. 4 is obtained as the previously recorded data from the track are read. The SNR characteristics for the portion of the track immediately following that portion written during step 202 are evaluated by the sense circuit 170 to determine whether a drop in signal strength has occurred, indicative of residual magnetization.

In response to the sensed residual magnetization, the routine passes to step 206 wherein an appropriate demagnetization current profile is selected and applied to remove the same. Preferably, a first profile is selected and applied to the head 112, with this first profile having a selected magnitude tapering characteristic (e.g., linear, exponential, etc.), frequency, time duration, etc. Depending upon the time taken to sense the residual magnetization, additional write currents may be applied during the operation of step 206 prior to the application of the demagnetization current.

Decision step 208 determines whether the application of the selected demagnetization current profile successfully removed the magnetization from the head 112, preferably by performing some portion of the sensing step 204. If not, the flow continues to step 210 where the profile is adjusted and then steps 202 through 208 are repeated. Once the selected profile is deemed successful, the selected profile is stored at step 212 and subsequently used at the conclusion of each write event. The routine then ends at step 214.

It will be noted that once an initial profile is selected, it is thereafter preferably used at the conclusion of each write event. Appropriate pad fields are provisioned at the end of each data region (sector) to which data are written to enable the demagnetization current to be employed without danger of overwriting previously written data. The routine 200 is thereafter performed during normal use of the device at each write operation, thereby continually evaluating and adapting the demagnetization current profile over time for then existing environmental conditions.

Figure 8:
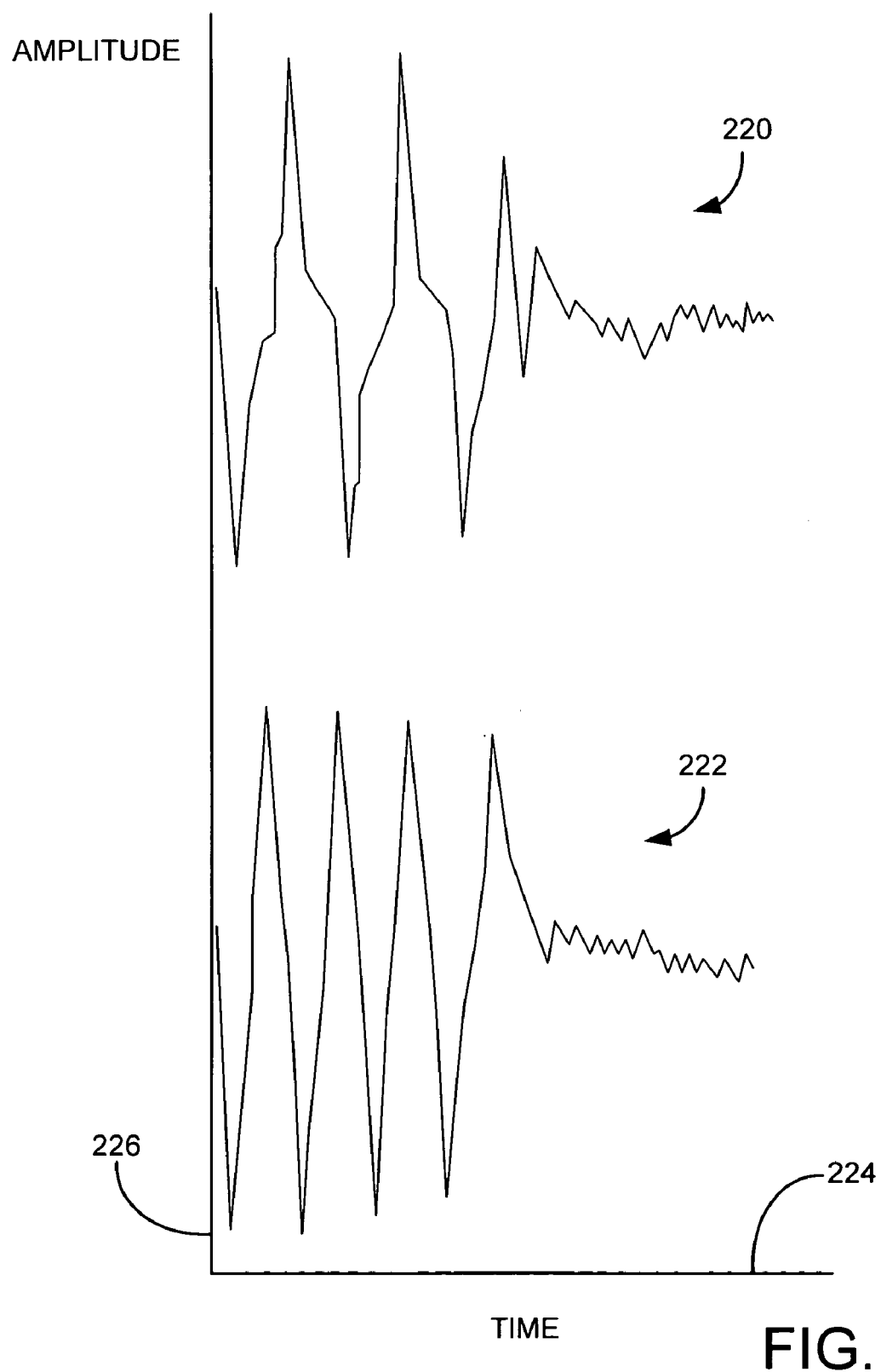
FIG. 8 graphically represents exemplary demagnetization currents that can be selectively applied by the routine of FIG. 7.

FIG. 8 graphically illustrates two different demagnetization current curves 220 and 222, plotted against common time x-axis 224 and common amplitude y-axis 226. These curves show how that different profiles can be advantageously employed as selected by the preamp 126; curve 220 has a relatively long elapsed time and employs different tapering and frequency characteristics as compared to curve 222.

Using the routine of FIG. 7, an optimum profile can be selected and maintained by the preamp 126 for each head 112. It will be noted that the optimum profile may involve a number of different adaptive characteristics, including changes in frequency of the demagnetizing current (including increases in frequency) as the current tapers to the final magnitude. The optimum profile may also be modified for each head over time due to changes in environmental or other factors.

As mentioned above, in some preferred embodiments the preamp 126 is substantially "self-contained" in that the control block 166, residual magnetization sense circuit 170 and the demagnetization current generator 168 cooperate to automatically and adaptively adjust the demagnetization profile as necessary to minimize the presence of the residual magnetization. In other preferred embodiments, sense data are reported to the servo circuit 130 and, in response, the servo circuit 130 provides appropriate control inputs to the preamp 126 to establish the profile characteristics.

It will now be appreciated that the present invention, as embodied herein and as claimed below, is generally directed to an apparatus and method for removing residual magnetization from a transducer (such as 112).

The method preferably includes steps of sensing a residual magnetization of a pole of a data transducer established by application of a write current to write data to a recording medium (such as by step 204), and removing said residual magnetization by supplying the transducer with a demagnetizing current that decreases to a final magnitude in accordance with a selected profile (such as by step 206).

Preferably, the removing step comprises applying a bi-directional, time varying current of selected frequency to the transducer that tapers to the final magnitude (such as 220, 222). The magnitude of the bi-directional, time varying current preferably tapers linearly, exponentially or in a step-wise fashion (such as 174, 176, 178).

The apparatus preferably includes a sense circuit (such as 170) which senses a residual magnetization of a pole (such as 134) of a data transducer (such as 112) established by application of a write current to write data to a recording medium. The apparatus further preferably includes a demagnetizing current generator (such as 168) coupled to the sense circuit which removes said residual magnetization by supplying the transducer with a demagnetizing current selected in relation to the sensed residual magnetization.

The apparatus further preferably comprises a data write current generator (such as 162) which applies said write currents to the transducer prior to operation of the sense circuit. Preferably, the sense circuit detects current induced by the residual magnetism in a conductor (such as 128) coupled to the pole.

As before, the demagnetizing current generator preferably applies a bi-directional, time varying current of selected frequency to the transducer that tapers to a final magnitude linearly, exponentially or in a step-wise fashion.

For purposes of the appended claims, the recited first means will be understood to correspond to the disclosed residual magnetization sense circuit 170 of FIG. 4, and equivalents thereof. The second means will be understood to correspond to the demagnetization current generator 168, which operates independently of or in conjunction with control inputs supplied by the servo circuit 130, and equivalents thereof. The recited "data transmission current" will be understood to comprise a current applied to the data transducer to transmit data, either to an adjacent recording medium or to a remote receiver.

It is to be understood that even though numerous characteristics and advantages of various embodiments of the present invention have been set forth in the foregoing description, together with details of the structure and function of various embodiments of the invention, this detailed description is illustrative only, and changes may be made in detail, especially in matters of structure and arrangements of parts within the principles of the present invention to the full extent indicated by the broad general meaning of the terms in which the appended claims are expressed. For example, the particular elements may vary depending on the particular application of the housing without departing from the spirit and scope of the present invention.

In addition, although the embodiments described herein are directed to the removal of residual magnetization in a perpendicular recording head of a data storage device used to record data to an adjacent recording medium, it will be appreciated by those skilled in the art that the claimed subject matter is not so limited and various other applications can be utilized, such as data transmission systems wherein data are transmitted to a remote receiver, without departing from the spirit and scope of the claimed invention.

What is claimed is:

1. A method comprising:
    applying a first demagnetizing current in accordance with a first profile to remove a first sensed residual magnetization of a pole of a data transducer;
    subsequently applying a data transmission current to the transducer to transmit data; and
    removing a second sensed residual magnetization of said pole by supplying the transducer with a different, second demagnetizing current in accordance with a second profile.

2. The method of claim 1, wherein the subsequently applying and removing steps are carried out at the conclusion of said application of the data transmission current and prior to a subsequent step of using the data transducer to receive data.

3. The method of claim 1, wherein the subsequently applying step comprises detecting current induced by the residual magnetism in a conductor coupled to the pole.

4. The method of claim 3, wherein the conductor is connected to a write coil of the transducer.

5. The method of claim 1, wherein the removing step comprises applying a bi-directional, time varying current of selected frequency to the transducer that tapers to a final magnitude.

6. The method of claim 5, wherein the magnitude of the hi-directional, time varying Current tapers linearly, exponentially or in a step-wise fashion.

7. The method of claim 5, wherein a frequency of the bi-directional, time varying current of the removing step changes as said current tapers to the final magnitude.

8. The method of claim 1 wherein the second profile utilizes a different duration of elapsed time during which the second demagnetizing current is applied as compared to the first demagnetizing current.

9. The method of claim 1, wherein the respective first and second profiles of the demagnetizing current are selected in accordance with a control input supplied by a control circuit.

10. The method of claim 1, wherein the transducer is characterized as a recording head and the data transmitted by the head in response to the data transmission current results in a selective magnetization of a recording medium adjacent the head.

11. The method of claim 10, wherein the transducer is characterized as a perpendicular recording head which stores data to the recording medium along magnetic domains that are substantially aligned in a direction normal to a direction of movement of the recording medium with respect to the head.

12. An apparatus, comprising:
    a sense circuit which senses a residual magnetization of a pole of a data transducer established by application of a data transmission current to transmit data; and
    a demagnetizing current generator which applies a first demagnetizing current in accordance with a first profile prior to the sensing by the sense circuit, and which applies a different, second demagnetizing current in accordance with a second profile in response to the sensed residual magnetization.

13. The apparatus of claim 12, further comprising a data transmission current generator which applies said data transmission currents to the transducer prior to operation of the sense circuit.

14. The apparatus of claim 12, wherein the sense circuit detects current induced by the residual magnetism in a conductor coupled to the pole.

15. The apparatus of claim 12, wherein the conductor is connected to a write coil of the transducer.

16. The apparatus of claim 12, wherein the demagnetizing current generator applies a hi-directional, time varying current of selected frequency to the transducer that tapers to a final magnitude.

17. The apparatus of claim 16, wherein a frequency of the bi-directional, time varying current changes as said current tapers to the final magnitude.

18. The apparatus of claim 16, wherein the magnitude of the bi-directional, time varying current tapers linearly, exponentially or in a step-wise fashion.

19. The apparatus of claim 12, wherein the second profile utilizes a different duration of elapsed time during which the second demagnetizing current is applied as compared to the first demagnetizing current.

20. The apparatus of claim 12 characterized as a preamplifier driver circuit configured for use in a data storage device to supply write currents to the transducer to write data to a recording medium and detect readback signals from the transducer obtain from data previously written to the recording medium.

21. The apparatus of claim 20, wherein the transducer is characterized as a perpendicular recording head which stores data to the recording medium along magnetic domains that are substantially aligned in a direction normal to a direction of movement of the recording medium with respect to the head.

22. A preamplifier driver circuit for use in a data storage comprising:
  first means for sensing a residual magnetization of a pole of a data transducer established by application of a write current to write data to a recording medium; and
  second means for removing said residual magnetization by supplying the transducer with a second demagnetizing current in accordance with a second profile selected in relation to the sensed residual magnetization, said second means further applying a first demagnetizing current in accordance with a different. first profile prior to the sensing by the first means.

* * * * *